(12) United States Patent
Yamayoshi et al.

(10) Patent No.: US 9,285,619 B2
(45) Date of Patent: Mar. 15, 2016

(54) DISPLAY PANEL, METHOD OF MANUFACTURING THE SAME, AND LIQUID CRYSTAL DISPLAY PANEL

(71) Applicant: Mitsubishi Electric Corporation, Tokyo (JP)

(72) Inventors: Kazushi Yamayoshi, Kumamoto (JP); Takeshi Sonoda, Kumamoto (JP); Koichi Takai, Kumamoto (JP); Osamu Miyakawa, Kumamoto (JP); Shinsuke Ogata, Kumamoto (JP); Takeshi Shimamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/277,863

(22) Filed: May 15, 2014

(65) Prior Publication Data
US 2014/0354932 A1 Dec. 4, 2014

(30) Foreign Application Priority Data
Jun. 4, 2013 (JP) .................. 2013-117491

(51) Int. Cl.
*G02F 1/1345* (2006.01)
*G02F 1/1333* (2006.01)
*G02F 1/1362* (2006.01)

(52) U.S. Cl.
CPC ........ *G02F 1/133345* (2013.01); *G02F 1/1333* (2013.01); *G02F 1/13452* (2013.01); *G02F 1/13458* (2013.01); *G02F 1/136227* (2013.01); *G02F 2001/133357* (2013.01)

(58) Field of Classification Search
CPC ............ G02F 1/133345; G02F 1/1333; G02F 2001/133357; G02F 1/13452; G02F 1/13458; G02F 1/136227
USPC .................................................. 349/149–152
See application file for complete search history.

(56) References Cited

U.S. PATENT DOCUMENTS

| 7,671,958 | B2 | 3/2010 | Fujita |
| 2007/0171319 | A1 | 7/2007 | Fujita et al. |
| 2008/0043196 | A1* | 2/2008 | Fujita .................... G02F 1/1345 349/152 |

FOREIGN PATENT DOCUMENTS

| JP | 2007-226175 A | 9/2007 |
| JP | 2008-077060 A | 4/2008 |

* cited by examiner

*Primary Examiner* — Charles Chang
(74) *Attorney, Agent, or Firm* — Studebaker & Brackett PC

(57) ABSTRACT

A liquid crystal display panel includes a thin film transistor disposed on an insulating substrate in a display region, an external wiring for connecting the thin film transistor to a terminal electrode, and a planarized film disposed on the thin film transistor, and having a planarized upper surface. The planarized film is not disposed, or a planarized film having a smaller film thickness than that of the planarized film in the display region is disposed, above the external wiring in a frame region.

10 Claims, 15 Drawing Sheets

F I G . 2
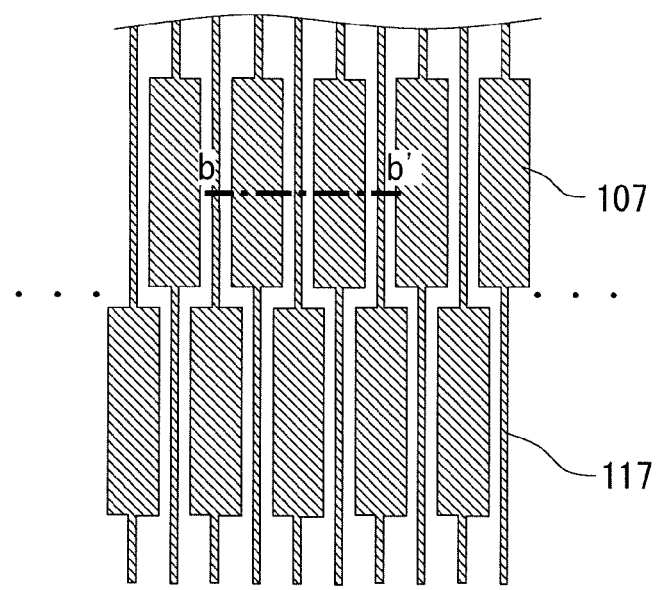

F I G . 6
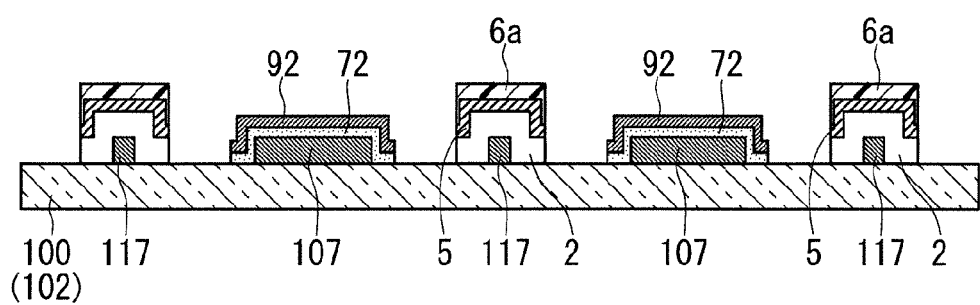
F I G . 7
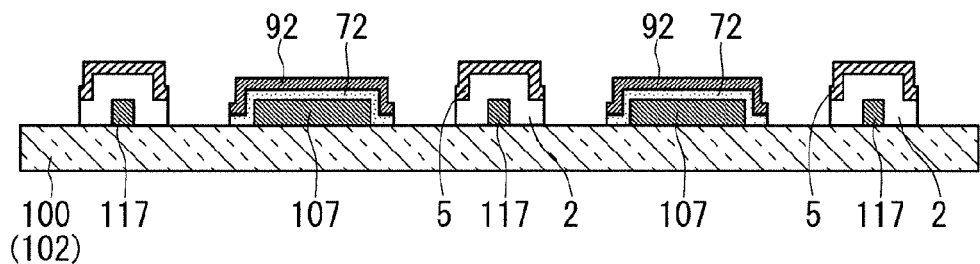

DISPLAY REGION

TERMINAL MOUNTED REGION

DISPLAY REGION

TERMINAL MOUNTED REGION

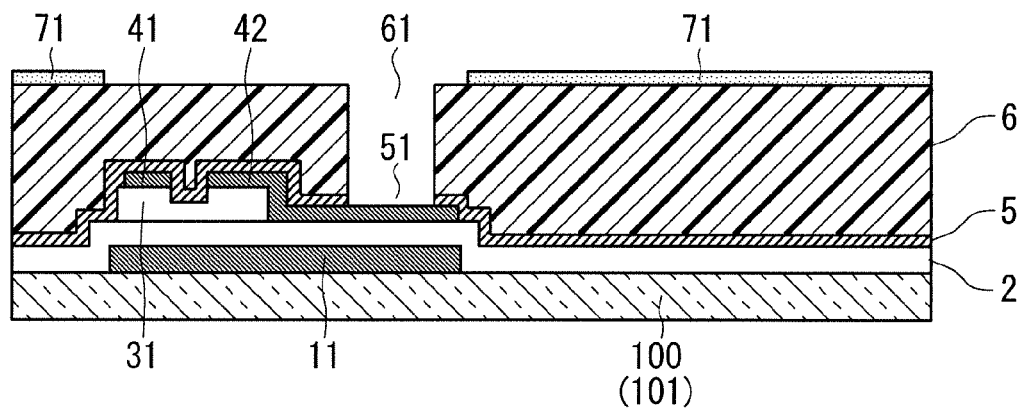
F I G. 1 4 A
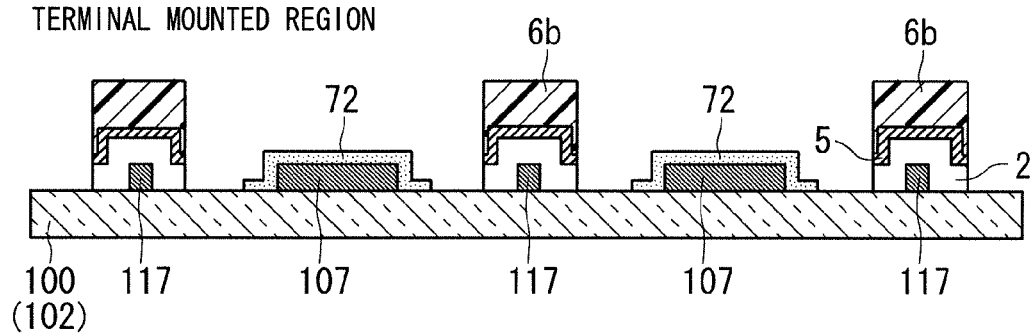
F I G. 1 4 B

DISPLAY REGION

TERMINAL MOUNTED REGION

F I G . 1 7
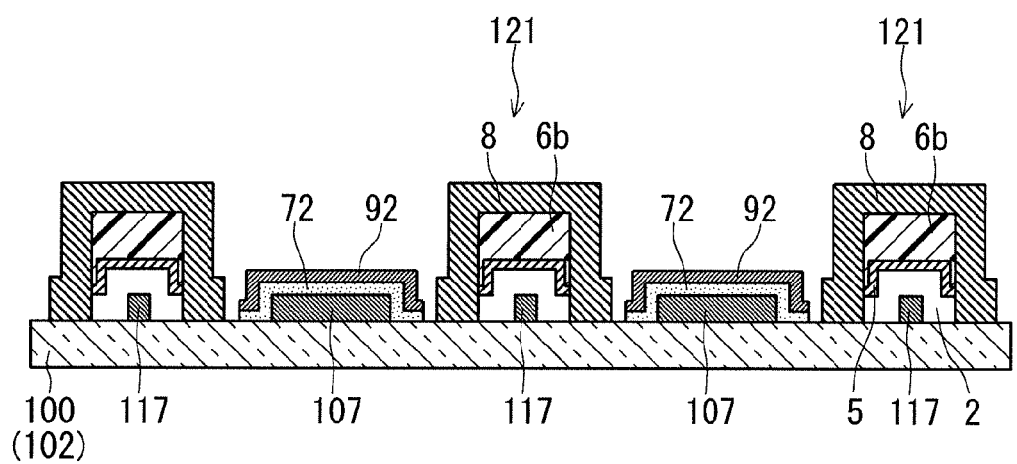

DISPLAY PANEL, METHOD OF MANUFACTURING THE SAME, AND LIQUID CRYSTAL DISPLAY PANEL

BACKGROUND OF THE INVENTION

1. Field of the Invention

The present invention relates to a display panel, a method of manufacturing the same, and a liquid crystal display panel having the display panel.

2. Description of the Background Art

Conventionally, as a display mode of a liquid crystal display device, a twisted nematic (TN) mode that generates an electric field in a direction vertical to a liquid crystal display panel has been widely used. Meanwhile, there is proposed a horizontal electric field mode in which liquid crystal molecules are driven in a horizontal direction by an electric field generated in a direction parallel to the liquid crystal display panel (horizontal direction). This horizontal electric field mode has an advantage in enhancing a viewing angle, and implementing high definition and high luminance, so that it is thought that this mode will become the mainstream in a small/medium size panel such as a smartphone or a tablet especially.

The horizontal electric field mode includes an in-plane switching (IPS) mode and a fringe field switching (FFS) mode. A FFS mode liquid crystal display device includes a lower electrode, an upper electrode having slits, and an insulating film provided between those electrodes, and one of the lower electrode and the upper electrode is used as a pixel electrode, and the other is used as an opposed electrode. When a voltage is applied between the pixel electrode and the opposed electrode, an electric field is generated in the liquid crystal layer in roughly a horizontal direction, and the liquid crystal molecules in the liquid crystal layer are driven by the electric field in the horizontal direction.

A signal line and a thin film transistor are formed below the upper electrode and the lower electrode with a protective insulating film interposed between them, in a display region of the liquid crystal display panel. The above-described electric field is generated when a certain signal (voltage) is externally applied to the lower electrode or the upper electrode through a contact hole of the protective insulating film after passing through the signal line, and the thin film transistor.

However, during an operation, parasitic capacity which causes a display quality to degrade is generated between the lower electrode and the signal line. Thus, an insulating film is formed between the lower electrode and the signal line, in order to reduce the parasitic capacity. As the insulating film, Japanese Patent Application Laid-Open No. 2007-226175 proposes using an acrylic resin film having a relatively large thickness that can reduce the parasitic capacity, and can eliminate an uneven surface of the thin film transistor.

The liquid crystal display panel includes not only the above-described display region but also a frame region surrounding the display region. The frame region includes a plurality of terminal electrodes, and a plurality of external wirings extended from the display region and connected to the plurality of the terminal electrodes, and each of the external wirings is covered with a protective insulating film that protects the external wiring from being damaged or corroded with water.

Here, in a process of manufacturing the liquid crystal display device, the terminal electrode of the liquid crystal display panel is electrically connected to an external element (such as a printed substrate or IC chip). More specifically, the terminal electrode exposed in the protective insulating film is bonded to the external element by pressure bonding through an anisotropic conductive film (ACF), whereby the terminal electrode and the external element are connected through conductive particles in the ACF.

However, in the case where the above-described acrylic resin film is formed above the external wiring in the frame region, there is a difference in height (uneven surface) roughly corresponding to a film thickness of the acrylic resin film, between the acrylic resin film formed above the external wiring, and the terminal electrode above which the acrylic resin film is not formed. Therefore, although the terminal electrode and the external element should be connected through the conductive particles in the ACF originally, they cannot be connected because the acrylic resin film is formed in the vicinity of the terminal electrode (the pressure force is dispersed to the acrylic resin film), that is, a contact defect is caused in some cases. Especially, when the external wiring and the terminal electrode are closely provided in order to miniaturize the frame region, it is thought that such problem becomes more conspicuous.

Meanwhile, in a case where the acrylic resin film is not formed above the external wiring, there is a problem that the protective insulating film to cover the external wiring and thus the external wiring are damaged in a process of manufacturing the liquid crystal display panel.

SUMMARY OF THE INVENTION

The present invention was made to solve the above problem, and it is an object of the present invention to provide a technique capable of surely connecting a terminal electrode to an external element.

A display panel according to the present invention includes an insulating substrate, a thin film transistor, a terminal electrode, a wiring, an insulating film, and a planarized film. A display region, and a frame region surrounding the display region are defined in the insulating substrate, the thin film transistor is disposed on the insulating substrate in the display region, and the terminal electrode is disposed on the insulating substrate in the frame region. The wiring is disposed on the insulating substrate to connect the thin film transistor to the terminal electrode, the insulating film has an opening over the terminal electrode and covers the wiring, and the planarized film is disposed on the thin film transistor and has a planarized upper surface. The planarized film is not disposed or a planarized film having a thinner film thickness than that of the planarized film disposed in the display region is disposed, above the wiring in the frame region.

The planarized film is not disposed or the planarized film having the thinner film thickness than that of the planarized film disposed in the display region is disposed, above the wiring in the frame region. Therefore, the terminal electrode and the external element can be surely connected.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a plan view illustrating a configuration of a frame region according to the first preferred embodiment;

FIGS. 6 and 7 are cross-sectional views each illustrating a terminal configuration according to the first preferred embodiment;

FIGS. 11A to 16B are cross-sectional views each to describe the method of manufacturing the liquid crystal display panel according to the first preferred embodiment; and FIG. 17 is a cross-sectional view illustrating a terminal configuration according to a second preferred embodiment.

DESCRIPTION OF THE PREFERRED EMBODIMENTS

<First Preferred Embodiment>

Figure 1:
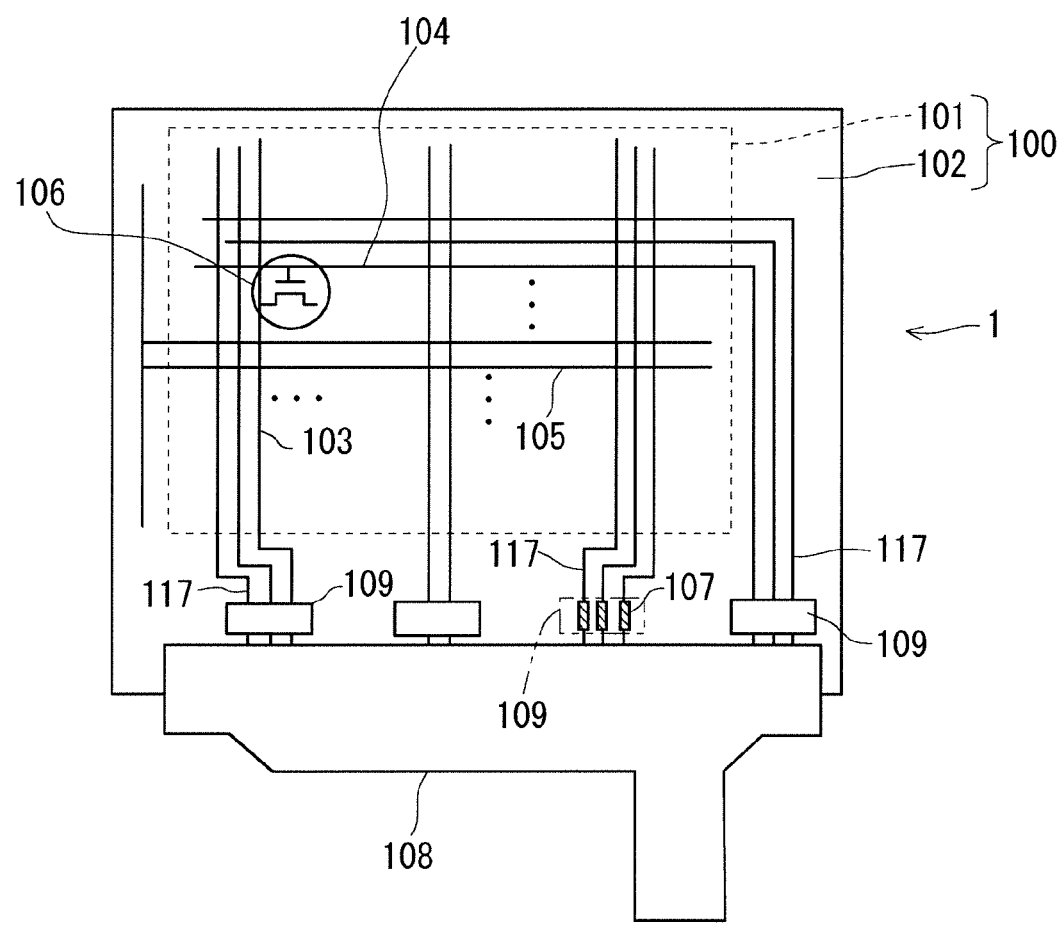
FIG. 1 is a plan view illustrating a configuration of a liquid crystal display panel according to a first preferred embodiment.

In a first preferred embodiment of the present invention, an FFS mode liquid crystal display panel including a display panel according to the present invention will be described, as an example. FIG. 1 is a plan view illustrating a configuration of the liquid crystal display panel according to the first preferred embodiment. In addition, FIG. 1 shows each component schematically, and a precise size and the like of the component is not reflected in the drawing. In addition, in FIG. 1, components other than a main part of the present invention are omitted and the configuration is partially simplified occasionally, so as not to make the drawing complicated. These are true in the following drawings. Furthermore, in the following drawings, the same component as described in the former drawing is given the same reference sign and its description is omitted.

A liquid crystal display panel 1 includes a transparent insulating substrate (insulating substrate) 100 in which a display region 101, and a frame region 102 surrounding the display region 101 are defined.

As shown in FIG. 1, the liquid crystal display panel 1 includes a thin film transistor 106 disposed on the transparent insulating substrate 100 in the display region 101, a terminal electrode 107 disposed on the transparent insulating substrate 100 in the frame region 102, and a wiring for electrically connecting the thin film transistor 106 to the terminal electrode 107. The wiring is disposed on the transparent insulating substrate 100 in both of the display region 101 and the frame region 102. Here, the wiring in the display region 101 corresponds to a signal line 103 or a scanning line 104, and the wiring in the frame region 102 corresponds to an external wiring 117.

In the frame region 102, the plurality of the external wirings 117 extended from the display region 101 are connected to the plurality of the terminal electrodes 107. The terminal electrode 107 is electrically connected to a terminal of an external element (a printed substrate 108 or an IC chip 109 here) through an anisotropic conductive film (ACF), a bump, or the like.

FIG. 2 is an enlarged plan view of a region in which the terminal electrodes 107 are formed (mounted) (hereinafter, referred to as the terminal mounted region), in the frame region 102 shown in FIG. 1.

The terminal electrode 107 is connected to an extension portion of the external wiring 117, and a width of the terminal electrode 107 is large compared to a width of the external wiring 117. In addition, the one terminal electrode 107 is not arranged adjacent to the other terminal electrodes 107 in an arrangement direction of the external wiring 117, but adjacent to the two external wirings 117 so as to be sandwiched between them. In this configuration, the adjacent external wirings 117 can be arranged closer to each other, so that an area of the frame region 102 can be more reduced.

Referring to FIG. 1 again, the display region 101 will be described. The plurality of the signal lines 103 and the scanning lines 104 which are insulated from each other are arranged so as to intersect with each other in the display region 101. Furthermore, a plurality of common wirings 105 are arranged parallel to the scanning lines 104. One pixel is disposed with the one signal line 103 and the one scanning line 104 intersecting with each other, and the plurality of the pixels are arranged in the form of a matrix in the whole display region 101.

Figure 3:
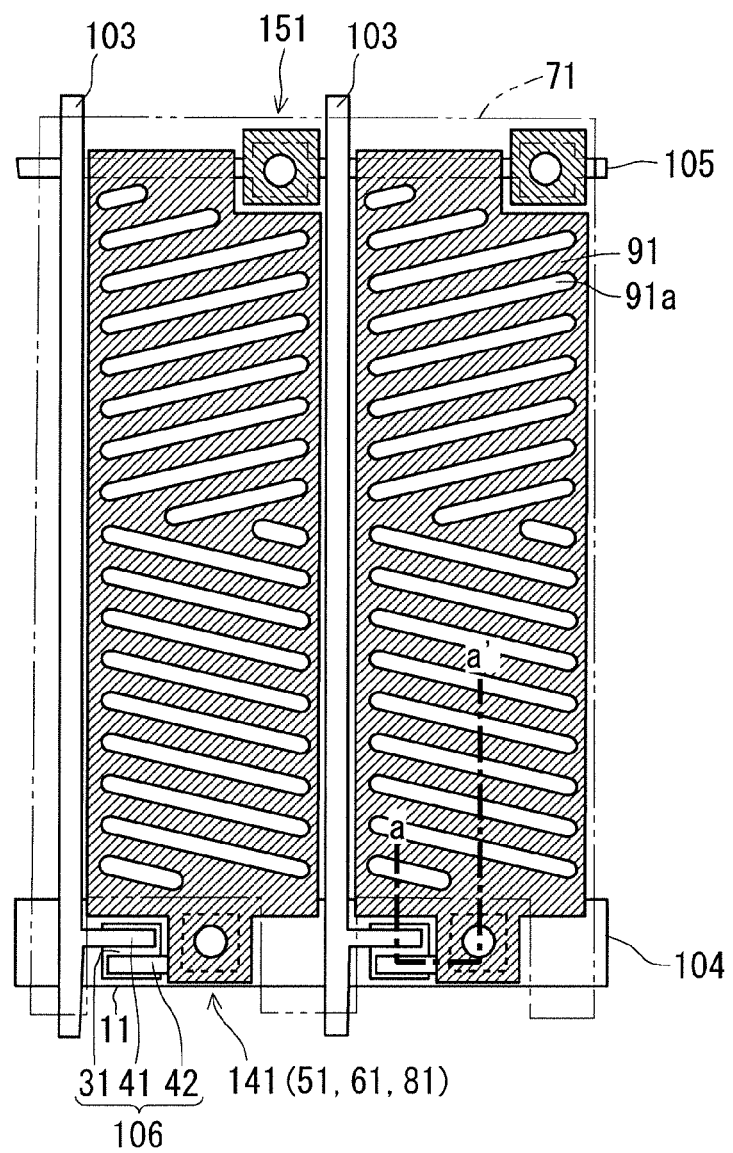
FIG. 3 is a plan view illustrating a configuration of a display region according to the first preferred embodiment.

FIG. 3 is a plan view illustrating the enlarged pixels disposed in the display region 101. The liquid crystal display panel 1 according to the first preferred embodiment includes a lower electrode 71 shown by a two-dot chain line in FIG. 3 and an upper electrode 91. One of the lower electrode 71 and the upper electrode 91 is used as a pixel electrode, and the other is used as an opposed electrode. Hereinafter, a description will be given on one configuration in which the lower electrode 71 serves as the opposed electrode, and the upper electrode 91 serves as the pixel electrode, as an example, but as the other configuration, the lower electrode 71 may serve as the pixel electrode, and the upper electrode 91 may serve as the opposed electrode, as a matter of course.

Here, the liquid crystal display panel 1 according to the first preferred embodiment includes a liquid crystal layer (not shown) above the upper electrode 91. The lower electrode 71 and the upper electrode 91 can apply a fringe electric field to the liquid crystal layer under the control of the thin film transistor 106 serving as a switching element. When a voltage is applied between the lower electrode 71 (opposed electrode) and the upper electrode 91 (pixel electrode), an electric field is generated and travels such that it travels from the upper electrode 91 toward the liquid crystal layer provided above the upper electrode 91, travels in a roughly horizontal direction in the liquid crystal layer, and travels toward the lower electrode 71 after passing through a slit 91a in the upper electrode 91 provided below the liquid crystal layer. Thus, liquid crystal molecules in the liquid crystal layer are driven in response to the electric field in the horizontal direction.

The thin film transistor 106 is provided between the lower electrode 71 and the upper electrode 91, and the transparent insulating substrate 100. A gate electrode 11 of the thin film transistor 106 is electrically connected to the scanning line 104, and a source electrode 41 of the thin film transistor 106 is electrically connected to the signal line 103. A drain electrode 42 of the thin film transistor 106 is electrically connected to the upper electrode 91 (pixel electrode) through a contact hole 141. Furthermore, the common wiring 105 is electrically connected to the lower electrode 71 (opposed electrode) through a contact hole 151.

The thin film transistor 106 turns on or off a supply of a display voltage to the pixel electrode (the upper electrode 91), based on a signal from the scanning line 104. In addition, the display voltage corresponds to signal data inputted from the external element such as the printed substrate 108 to the signal line 103 through the external wiring 117.

More specifically, when the signal is supplied from the scanning line 104 to the gate electrode 11 of the thin film transistor 106, the thin film transistor 106 applies a current from the source electrode 41 toward the drain electrode 42. That is, when the signal is supplied from the scanning line 104, the thin film transistor 106 applies the voltage corresponding to the signal data of the signal line 103 to the upper electrode 91 (pixel electrode).

Meanwhile, when the signal is not supplied from the scanning line 104 to the gate electrode 11 of the thin film transistor 106, the thin film transistor 106 does not apply a current from the source electrode 41 toward the drain electrode 42. That is, when the signal is not supplied from the scanning line 104, the thin film transistor 106 does not apply the voltage corresponding to the signal data of the signal line 103 to the upper electrode 91 (pixel electrode).

The signal of the scanning line 104 and the signal data of the signal line 103 are controlled by the external element (the printed substrate 108 or the IC chip 109 in this case) connected to the terminal electrode 107, and the voltage corresponding to the external display data is supplied to each pixel.

Next, a configuration of the display region 101 and a configuration of the frame region 102 will be described with reference to the cross-sectional views. First, the configuration of the display region 101 will be described.

<Configuration of Display Region 101>

Figure 4:
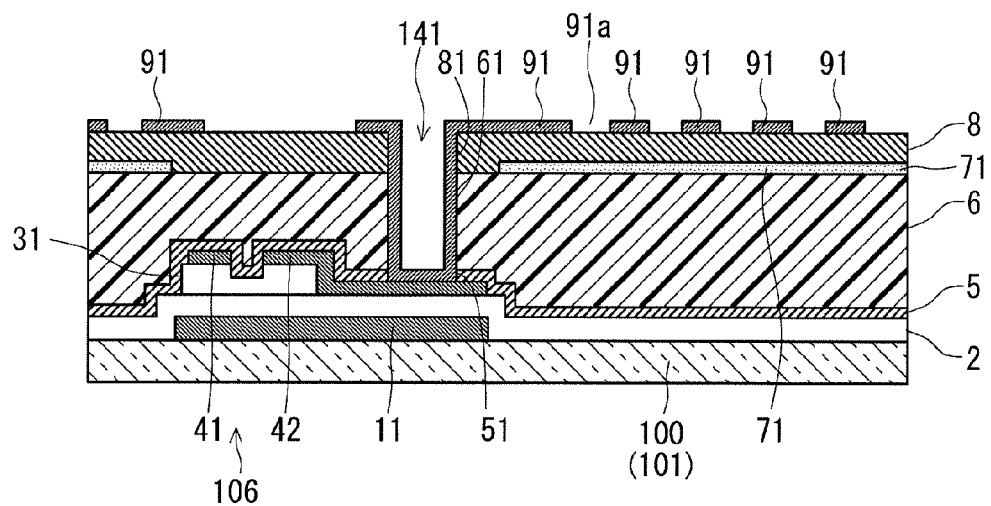
FIG. 4 is a cross-sectional view illustrating the configuration of the display region according to the first preferred embodiment.

FIG. 4 is a cross-sectional view illustrating the configuration of the display region 101 (configuration of the pixel), and more specifically, the cross-sectional view along a line a-a' shown in FIG. 3. In addition, the components in the display region 101 will be described mainly here, but the components in the frame region 102 will be also described occasionally.

The thin film transistor 106 according to the first preferred embodiment is provided with the gate electrode 11, a gate insulating film 2, a semiconductor film 31, the source electrode 41, and the drain electrode 42.

The scanning line 104 is disposed on the transparent insulating substrate 100 in the display region 101, and a part corresponding to the thin film transistor 106, of the scanning line 104 serves as the gate electrode 11. Furthermore, the common wiring 105 (FIG. 3) is disposed parallel to the scanning line 104, on the transparent insulating substrate 100 in the display region 101.

Meanwhile, the external wiring 117 (FIG. 1) connected to the scanning line 104 is disposed on the transparent insulating substrate 100 in the frame region 102. In addition, here, the scanning line 104 (the gate electrode 11), the common wiring 105, and the external wiring 117 connected to the scanning line 104 are formed by patterning the same metal film.

The gate insulating film 2 is disposed on the transparent insulating substrate 100 so as to cover the scanning line 104 (the gate electrode 11), the common wiring 105, and the external wiring 117 connected to the scanning line 104. The gate insulating film 2 may be composed of a SiN film. In addition, as will be described below, the gate insulating film 2 has an opening for exposing the terminal electrode 107.

The semiconductor film 31 is patterned and disposed into an island shape on the gate electrode 11 with the gate insulating film 2 interposed between them. The semiconductor film 31 is made of any of amorphous silicon, microcrystal silicon, and polycrystalline silicon, or a silicon semiconductor provided by laminating the above silicon, or an oxide semiconductor, for example. The semiconductor film 31 has a channel region, and a source region and a drain region provided so as to sandwich the channel region.

The source electrode 41, the drain electrode 42, and the signal line 103 (FIG. 3) connected to the source electrode 41 are disposed on the gate insulating film 2 in the display region 101. In addition, the source electrode 41 is disposed so as to be in contact with the source region of the semiconductor film 31, and the drain electrode 42 is disposed so as to be in contact with the drain region of the semiconductor film 31.

Meanwhile, the external wiring 117 (FIG. 1) connected to the signal line 103 is disposed on the gate insulating film 2 in the frame region 102. In addition, here, it is supposed that the source electrode 41, the drain electrode 42, the signal line 103, and the external wiring 117 connected to the signal line 103 are formed by patterning the same metal film.

A protective insulating film 5 is disposed on the gate insulating film 2 so as to directly or indirectly cover the thin film transistor 106, the signal line 103, the external wiring 117 connected to the signal line 103, the scanning line 104, and the external wiring 117 connected to the scanning line 104. In addition, as will be described below, the protective insulating film 5 has an opening for exposing the terminal electrode 107.

The protective insulating film 5 is composed of an inorganic insulating film such as a SiN film or silicon oxide film (SiO film). When the inorganic insulating film is used for the protective insulating film 5, it is possible to prevent the signal line 103, the scanning line 104, and the external wiring 117 from being damaged because the inorganic insulating film has relatively high mechanical strength. Furthermore, when the inorganic insulating film such as the SiN film is used for the protective insulating film 5, water leaching from an organic planarized film 6 to the signal line 103, the scanning line 104, and the external wiring 117 can be prevented, so that it is possible to prevent corrosion by water and deterioration of characteristics of the thin film transistor 106.

A planarized film (the organic planarized film 6 in FIG. 4) having a planarized upper surface is disposed on the thin film transistor 106 and above the signal line 103 and the scanning line 104 in the display region 101. An uneven surface in the thin film transistor 106 is filled with this planarized film, and an upper surface of the planarized film is almost flat without reflecting (transferring) the uneven surface disposed under the planarized film. Thus, the lower electrode 71 and the upper electrode 91 are disposed on the planarized plane.

The planarized film is composed of an organic resin film mainly made of acrylic or spin-on-glass (SOG) film, for example. Each of the acrylic resin film and the SOG film has a dielectric constant (about 3 to 4) lower than a dielectric constant (about 6 to 7) of the SiN film, so that when the acrylic resin film or the SOG film is used for the planarized film, it is possible to reduce parasitic capacity between the signal line 103 and the lower electrode 71. That is, it is possible to prevent a noise from the signal line 103 from harmfully affecting the lower electrode 71 during an operation of the liquid crystal display panel 1, so that a display quality can be improved. In addition, a SiO film has a dielectric constant which is about the same as that of the SOG film, but it is not suitable for the planarized film because it is difficult to be planarized.

Hereinafter, a description will be given, assuming that the organic resin film is used for the planarized film, and the planarized film is referred to as the organic planarized film 6. In addition, when a photosensitive organic resin film is used for the organic planarized film 6, a desired pattern can be formed in the organic planarized film 6 by a photolithography process (photoengraving process).

On the organic planarized film 6 in the display region 101, the following components are disposed, that is, the lower electrode 71 composed of a transparent conductive film made of IZO or ITO, an interlayer insulating film 8 composed of a SiN film, the upper electrode 91 composed of a transparent conductive film made of IZO or ITO, and the liquid crystal layer are disposed in this order. That is, the liquid crystal layer is disposed above the organic planarized film 6 in the display region 101, and the upper electrode 91 (pixel electrode) and the lower electrode 71 (opposed electrode) are disposed between the organic planarized film 6 and the liquid crystal layer in the display region 101.

Contact holes 51, 61, and 81 are formed in the protective insulating film 5, the organic planarized film 6, and the interlayer insulating film 8, respectively. These contact holes 51, 61, and 81 compose the contact hole 141 provided over the drain electrode 42. One part of the upper electrode 91 is electrically connected to the drain electrode 42 through the contact hole 141.

Similarly, contact holes are formed in the gate insulating film 2, the protective insulating film 5, and the organic planarized film 6, respectively, and these contact holes compose the contact hole 151 (FIG. 3) provided over the common wiring 105. One part of the lower electrode 71 is electrically connected to the common wiring 105 through the contact hole 151.

<Configuration of Frame Region 102>

Next, a description will be given on the configuration of the frame region 102, and more specifically on a configuration of the terminal mounted region (hereinafter, referred to as the terminal configuration).

In addition, the two terminal configurations exist, that is, the one regarding the external wiring 117 connected to the scanning line 104, and the one regarding the external wiring 117 connected to the signal line 103. However, the terminal configuration of the external wiring 117 connected to the signal line 103 is similar to the terminal configuration of the external wiring 117 connected to the scanning line 104 except that the gate insulating film 2 is omitted. Therefore, in the following, the terminal configuration of the external wiring 117 connected to the scanning line 104 is only described, and a description of the terminal configuration of the external wiring 117 connected to the signal line 103 is omitted.

Figure 5:
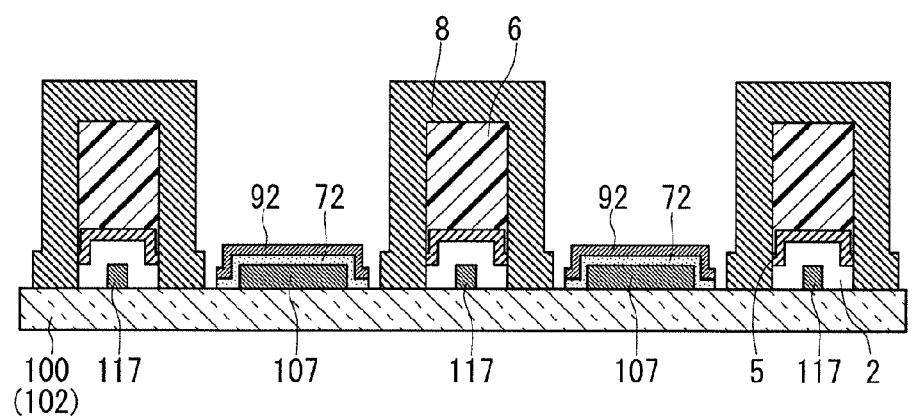
FIG. 5 is a cross-sectional view illustrating a related terminal configuration.

FIG. 5 is a cross-sectional view illustrating a terminal configuration related to the terminal configuration according to the first preferred embodiment (hereinafter, referred to as the related terminal configuration), and FIG. 6 is a cross-sectional view illustrating the terminal configuration according to the first preferred embodiment. More specifically, FIGS. 5 and 6 are cross-sectional views along a line b-b' shown in FIG. 2.

As shown in FIGS. 5 and 6, in each of the related terminal configuration and the terminal configuration according to the first preferred embodiment, the external wiring 117 is covered with the insulating films (the gate insulating film 2 and the protective insulating film 5), and the terminal electrode 107 is exposed in the opening of the insulating films (the gate insulating film 2 and the protective insulating film 5) and in the opening of the organic planarized film 6 or 6a.

Here, it is to be noted that according to the related terminal configuration (FIG. 5), the organic planarized film 6 having the same film thickness as that of the organic planarized film 6 in the display region 101 is disposed above the external wiring 117, while according to the terminal configuration in the first preferred embodiment (FIG. 6), the organic planarized film 6a having a film thickness smaller than that of the organic planarized film 6 in the display region 101 is disposed above the external wiring 117 in the frame region 102.

Furthermore, according to the related terminal configuration (FIG. 5), the interlayer insulating film 8 is disposed above the external wiring 117, while according to the terminal configuration in the first preferred embodiment (FIG. 6), the interlayer insulating film 8 is not disposed above the external wiring 117 in the frame region 102.

According to the terminal configuration in the first preferred embodiment, a difference between a height of a laminated structure including the terminal electrode 107, and a height of a laminated structure including the external wiring 117 (difference in height) can be smaller than that of the related terminal configuration. Therefore, pressure bonding between the terminal electrode 107 and the external element with the ACF sandwiched between them is not hindered by the organic planarized film 6, so that the terminal electrode 107 and the external element can be surely connected.

Furthermore, the terminal configuration according to the first preferred embodiment is not limited to the configuration shown in FIG. 6, and it may include a configuration in which the organic planarized film is not disposed above the external wiring 117 in the frame region 102 as shown in FIG. 7. According to such configuration, a difference between the height of the configuration above the terminal electrode 107 and the height of the configuration above the external wiring 117 (difference in height) can be further reduced, so that the terminal electrode 107 and the external element can be further surely connected.

<Production Process>

Next, a production process of the liquid crystal display panel 1 according to the first preferred embodiment will be sequentially described with reference to FIGS. 8A to 16B. FIGS. 8A, 9A, and 11A to 16A are cross-sectional views each illustrating the configuration of the display region 101, FIGS. 8B, 9B, and 11B to 16B are cross-sectional views each illustrating the configuration of the frame region 102 (terminal mounted region). As can be seen from the following description, the configuration of the display region 101 and the configuration of the frame region 102 are formed concurrently.

First, a metal film is formed by sputtering or the like on a whole surface of the transparent insulating substrate 100 such as a glass substrate. The metal film is made of aluminum (Al), an alloy containing it, molybdenum (Mo), or chrome (Cr), for example. Then, a photoresist composed of photosensitive resin is coated on the metal film by spin coating and the like, and the coated photoresist is exposed and developed in a first photolithography process, whereby the photoresist is patterned.

Then, the metal film is etched with the patterned photoresist used as an etching mask. Thus, the scanning line 104 (the gate electrode 11) and the common wiring 105 are formed on the transparent insulating substrate 100 in the display region 101, and the external wiring 117 connected to the scanning line 104 and the terminal electrode 107 are formed on the transparent insulating substrate 100 in the frame region 102. That is, the wirings (the scanning line 104 and the external wiring 117) for connecting the thin film transistor 106 (the gate electrode 11) to the terminal electrode 107 are formed on the transparent insulating substrate 100. After that, the photoresist is removed.

Next, the gate insulating film 2 and the semiconductor film that becomes the semiconductor film 31 are sequentially formed, for example, by plasma chemical vapor deposition (CVD) on the whole surface of the transparent insulating substrate 100 having the gate electrode 11 and the like. In addition, the gate insulating film 2 may be composed of a SiN film. Then, a photoresist is patterned in a second photolithography process and then ions are implanted, whereby the source region, the channel region, and the drain region of the thin film transistor 106 are formed in the semiconductor film. In addition, the semiconductor film is patterned into an island shape by etching, whereby the semiconductor film 31 is formed. After that, the photoresist is removed.

Then, a metal film is formed by sputtering or the like, on the whole surface of the transparent insulating substrate 100 having the semiconductor film 31 and the like. The metal film is made of aluminum (Al), an alloy containing it, or molybdenum (Mo), or chrome (Cr), for example. Then, a photoresist is patterned in a third photolithography process, the metal film is etched, and the photoresist is removed, whereby the source electrode 41, the drain electrode 42, and the signal line 103 are formed on the transparent insulating substrate 100 (the gate insulating film 2) in the display region 101. That is, the thin film transistor 106 is formed on the transparent insulating substrate 100 in the display region 101.

Figure 8A:
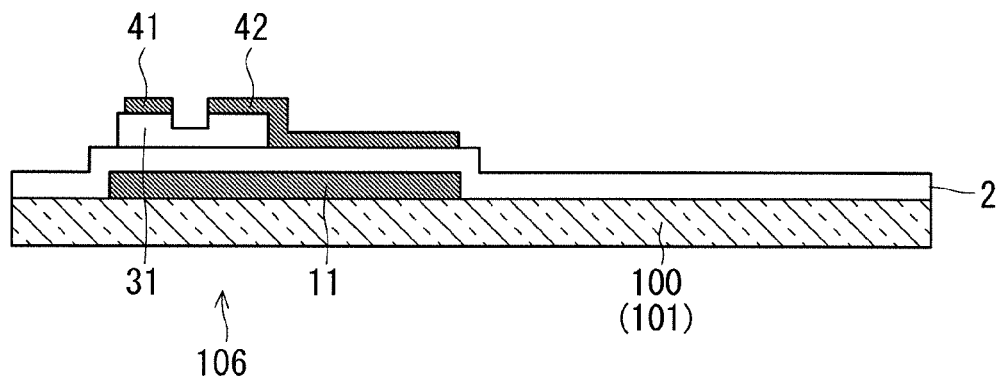
FIGS. 8A to 9B are cross-sectional views each to describe a method of manufacturing a liquid crystal display panel according to the first preferred embodiment.
Figure 8B:
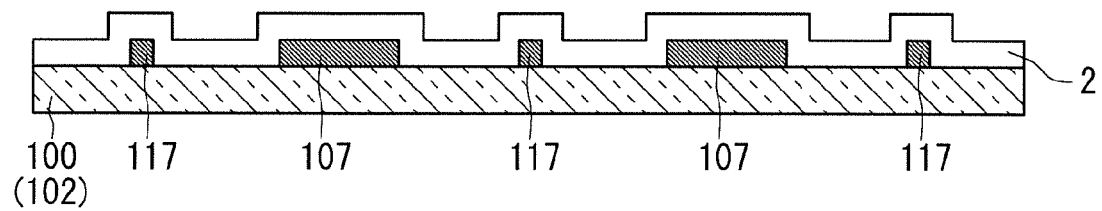

At the same, the external wiring 117 connected to the signal line 103 is formed on the transparent insulating substrate 100 (the gate insulating film 2) in the frame region 102. That is, the wirings (the signal line 103 and the external wiring 117) for connecting the thin film transistor 106 (the source electrode 41) to the terminal electrode 107 are formed on the gate insulating film 2 (the transparent insulating substrate 100). A structure obtained through the above-described process is shown in FIGS. 8A and 8B.

Then, the protective insulating film 5 is formed by plasma CVD on the whole surface of the transparent insulating substrate 100 having the source electrode 41 and the like. That is, the protective insulating film 5 is formed to cover the thin film transistor 106, the terminal electrode 107, and the wirings (the signal line 103, the scanning line 104, and the external wiring 117). In addition, the protective insulating film 5 may be composed of a SiN film, for example.

Figure 9A:
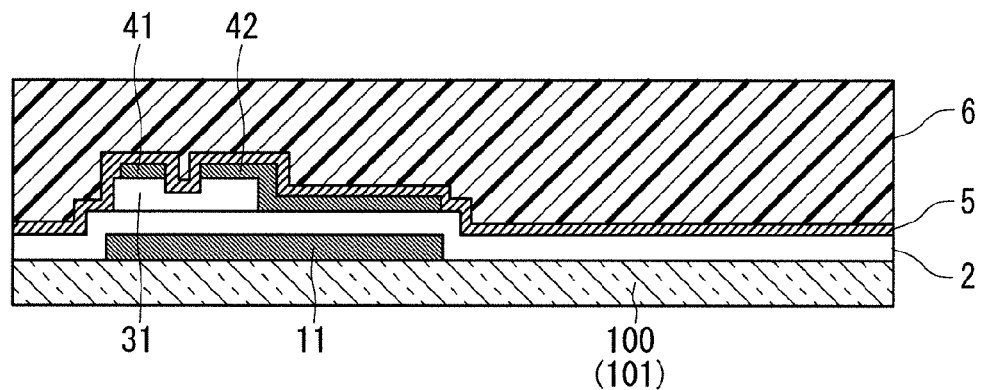
Figure 9B:
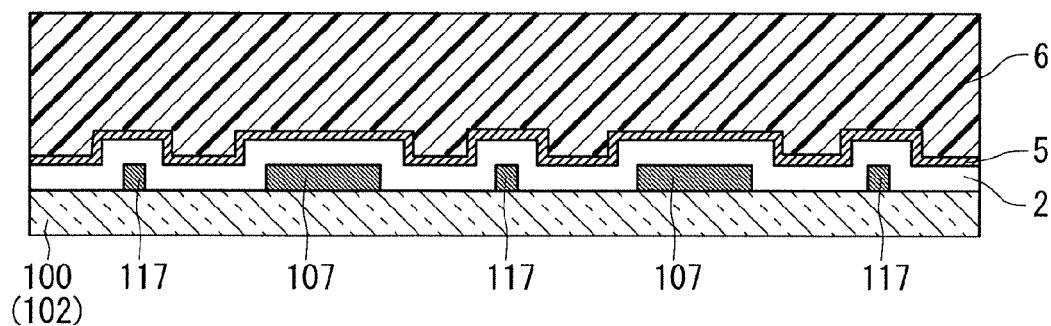

Then, the organic planarized film 6 having a planarized upper surface is coated (formed) by spin coating and the like, on the whole surface of the transparent insulating substrate 100 having the protective insulating film 5. In addition, here, the organic planarized film 6 is composed of a photosensitive organic resin film, and formed to have a thickness of 2 μm to 4 μm, for example. A structure obtained through the above-described process is shown in FIGS. 9A and 9B.

Then, the organic planarized film 6 is exposed and developed with a photomask 200 in a fourth photolithography process. Hereinafter, the photomask 200 will be described in detail.

Figure 10A:
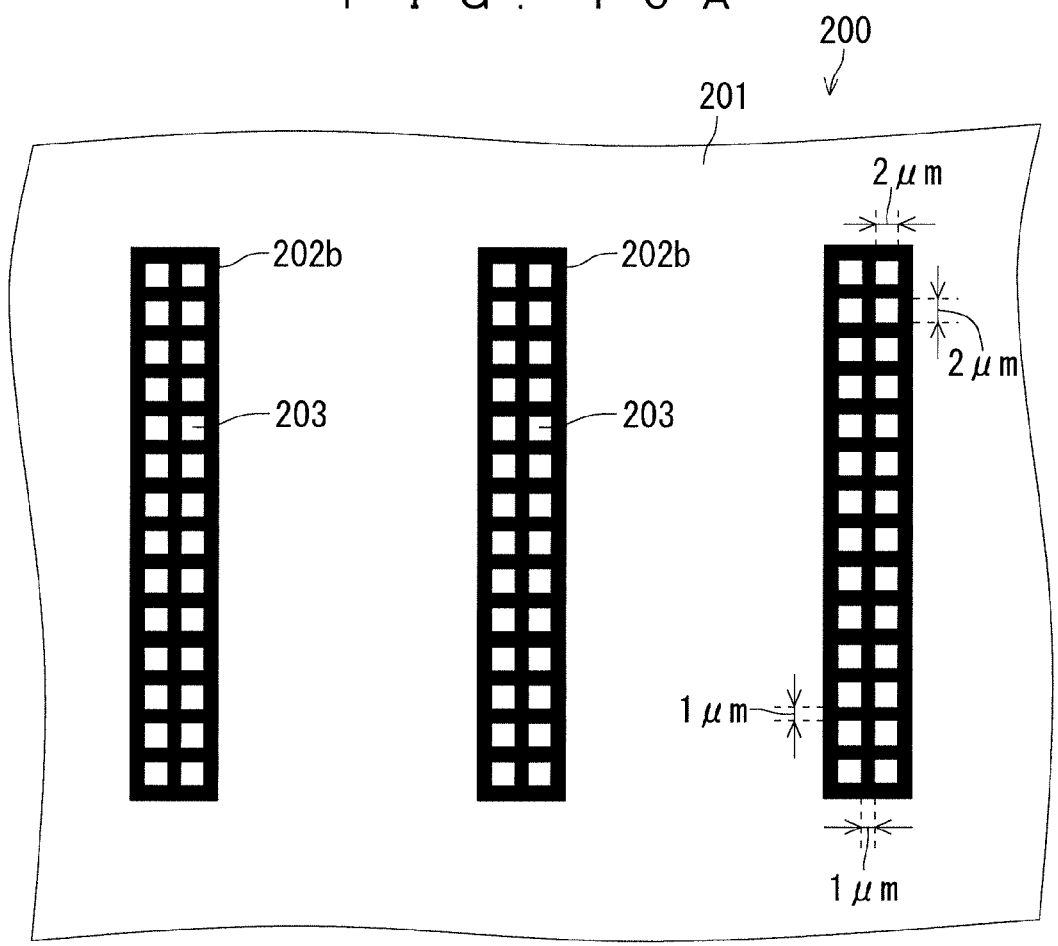
FIGS. 10A and 10B are views each illustrating a photomask according to the first preferred embodiment.
Figure 10B:
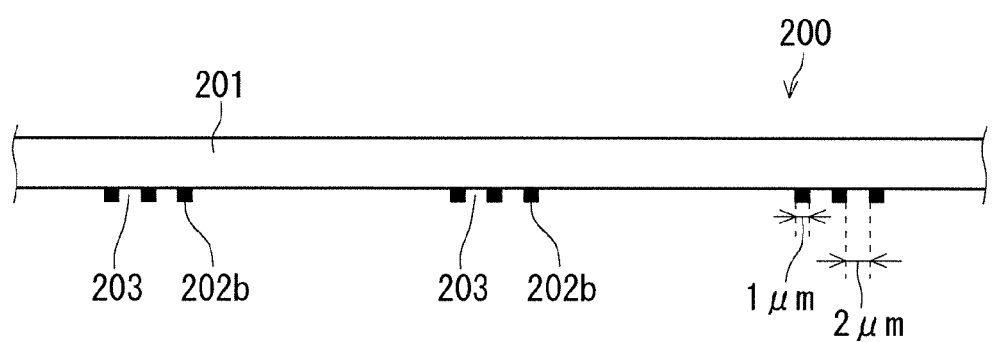

FIG. 10A is a plan view illustrating a part of the photomask 200, and FIG. 10B is a side view illustrating a part of the photomask 200. The photomask 200 used in exposing the organic planarized film 6 includes a half tone mask (hereinafter, referred to as the HT mask) or a gray tone mask (hereinafter, referred to as the GT mask).

The HT mask controls transmittance with a transmittance control layer. Meanwhile, the GT mask has a light-blocking portion having an opening formed of a pattern of fine slits and dots, and irradiated light passing through the opening (transmission amount) can be controlled by adjusting a size of the opening. The HT mask and the GT mask can be used for the photomask 200, but the HT mask needs a transmittance control layer other than an ordinary exposure pattern layer, and its cost is higher than that of the GT mask, so that a description will be given below on a case where the GT mask is used for the photomask 200.

The photomask 200 proposed by the inventor has a transparent substrate 201, an ordinal light-blocking portion 202a, and a light-blocking pattern 202b serving as the light-blocking portion having a lattice pattern (a kind of a dot pattern) shown in FIG. 10A. The light-blocking pattern 202b has a plurality of square openings (hereinafter, referred to as the lattices 203).

The irradiated light from an exposure device is diffracted when it passes through the lattice 203 of the light-blocking pattern 202b. Thus, an exposure amount in a region corresponding to the light-blocking pattern 202b becomes uniform, and the exposure amount in the region corresponding to the light-blocking pattern 202b is less than an exposure amount in a region other than the region corresponding to the light-blocking portion 202a or the light-blocking pattern 202b.

Figure 11A:
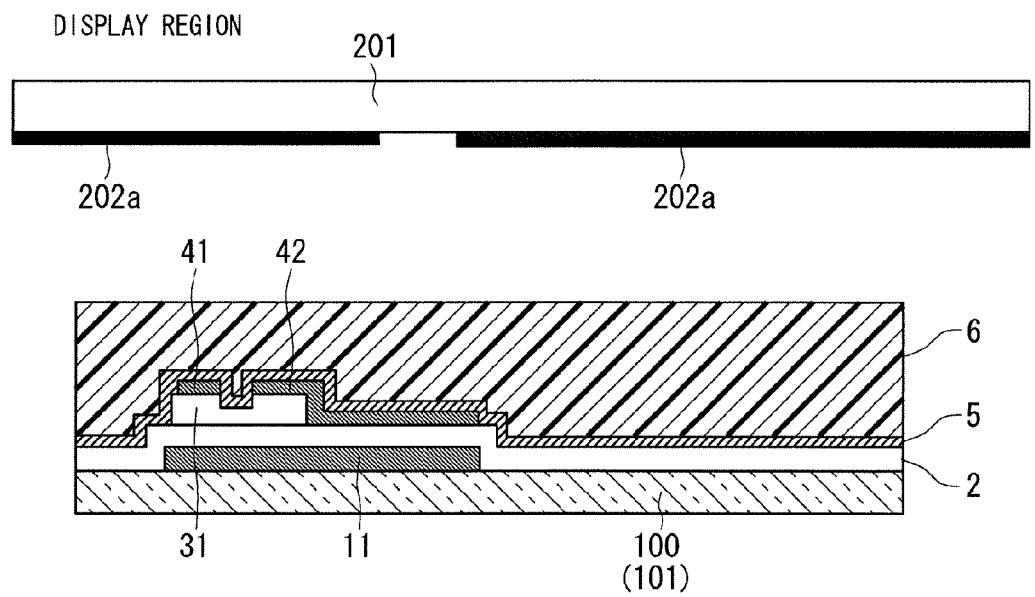
Figure 11B:
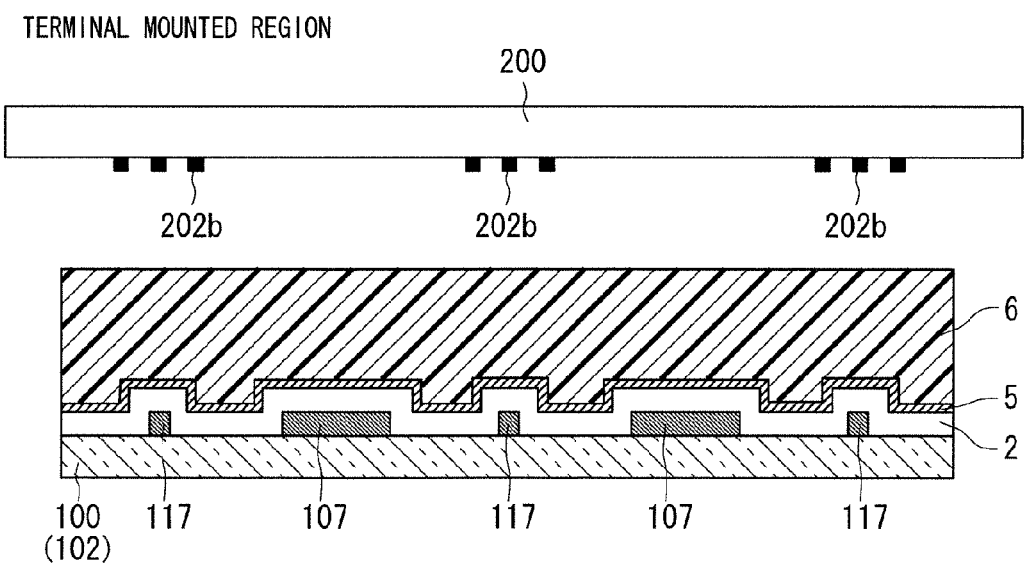
Figure 12A:
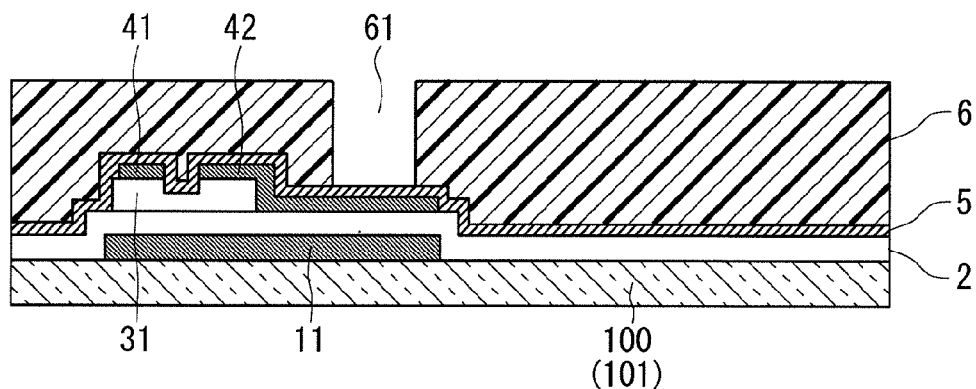
Figure 12B:
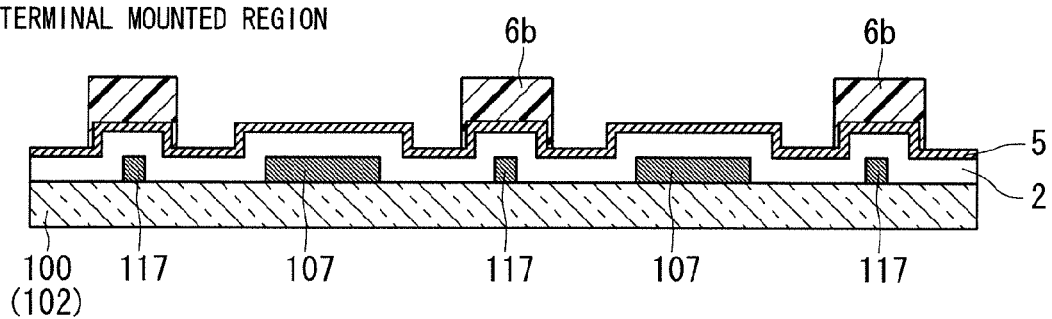

FIGS. 11A and 11B show the process in which the organic planarized film 6 is exposed with the photomask 200, and FIGS. 12A and 12B show the process in which the organic planarized film 6 is developed after exposed.

In the exposure process of the display region 101 shown in FIG. 11A, the organic planarized film 6 is not exposed in a region just under the ordinal light-blocking portion 202a, but the organic planarized film 6 is exposed in a region other than that (a certain region on the drain electrode 42 of the thin film transistor 106, and a certain region on the common wiring 105). Therefore, in the development process for the display region 101 shown in FIG. 12A, the exposed organic planarized film 6 is removed, whereby the contact hole 61 shown in FIG. 12A, and a contact hole serving as a part of the contact hole 151 (FIG. 3) are formed in the organic planarized film 6.

Meanwhile, in the exposure process of the frame region 102 shown in FIG. 11B, the organic planarized film 6 is exposed in a region just under the light-blocking pattern 202b and in a region other than that region. However, the exposure amount in the region just under the light-blocking pattern 202b (region above the external wiring 117) is less than an exposure amount in the region (region above the terminal electrode 107) other than that region. Therefore, in the development process of the frame region 102 shown in FIG. 12B, the organic planarized film 6 above the terminal electrode 107 is removed, while the organic planarized film 6 above the external wiring 117 is removed a little (film is thinned) and its film thickness is reduced. In addition, hereinafter, the organic planarized film whose film thickness is reduced in the development process is referred to as an organic planarized film 6b. Here, the organic planarized film 6b is thinner than the organic planarized film 6 by about 0.5 μm to 1.2 μm, for example.

Here, as for the lattice pattern of the photomask 200, a sum (pitch) of a size of one lattice 203 and a distance between the two adjacent lattices 203 is preferably 3 μm, and the size of the one lattice 203 is preferably equal to or less than 2 μm which is equal to or less than a resolution of the exposure device (that is, 2 μm or less×2 μm or less). In this case, the exposure amount can be uniform in the region corresponding to the light-blocking pattern 202b, and the upper surface of the organic planarized film 6b can be planarized.

In addition, the removed amount of the thickness of the organic planarized film 6b in the development process corresponds to the exposure amount directly applied in the exposure process, so that it can be controlled by the irradiated light from the exposure device and its transmittance. However, in the case where the organic planarized film 6 is composed of the organic resin film mainly made of acrylic which sensitively reacts with the exposure, even when the exposure amount is small, the removed amount of the thickness of the organic planarized film 6 provided above the external wiring 117 (film reduction amount) becomes large in the development process.

Thus, it is preferable to use the photomask 200 in which the size of the one lattice 203 in the lattice pattern is 2 μm (that is, 2 μm×2 μm), and the distance between the two adjacent lattices 203 in the lattice pattern is 1 μm. In this case, a ratio of the exposure amount (transmit amount) to the irradiated light is about 20%, so that the removed amount of the thickness of the organic planarized film 6 (film reduction amount) can be adjusted to be an appropriate amount. Actual measurement was made and it was found that the organic planarized film 6b was thinner than the organic planarized film 6 by 0.8 μm.

In the above, the description has been given on the case where the photomask 200 that has the light-blocking portion having the lattice pattern is used, but the photomask is not limited to this. For example, instead of the photomask 200 having the light-blocking portion having the lattice pattern, a photomask that has a light-blocking portion having a slit pattern may be used. In this case, it is preferable to use a photomask in which a sum (pitch) of a size of the one slit and a distance between the two adjacent slits is 2 μm to 3 μm (more preferably 2.5 μm), and the size of the one slit is equal to or less than about 1 μm which is equal to or less than the resolution of the exposure device.

In each case of the lattice pattern and the slit pattern, when a ratio of the size of the lattice 203 or the slit is small, the removed amount of the organic planarized film 6 is small in the development process, and when the ratio is great, the removed amount is great. Furthermore, in the case of the slit pattern, when the pitch is small, the removed amount of the organic planarized film 6 is great in the development process, and when the pitch is large, the removed amount is small.

After the development process shown in FIGS. 12A and 12B, the protective insulating film 5 and the gate insulating film 2 are subjected to dry etching with the organic planarized film 6 or 6b used as an etching mask. A structure obtained by the dry etching is shown in FIGS. 13A and 13B.

Figure 13A:
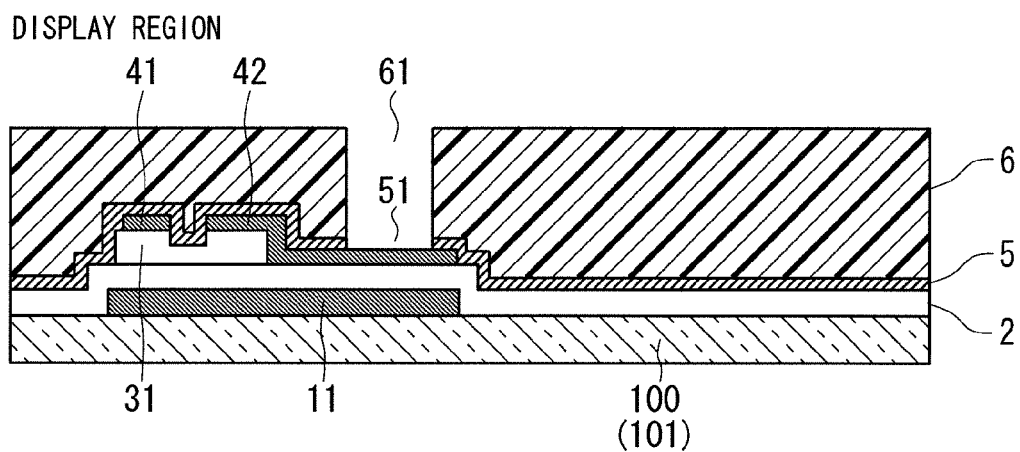
Figure 13B:
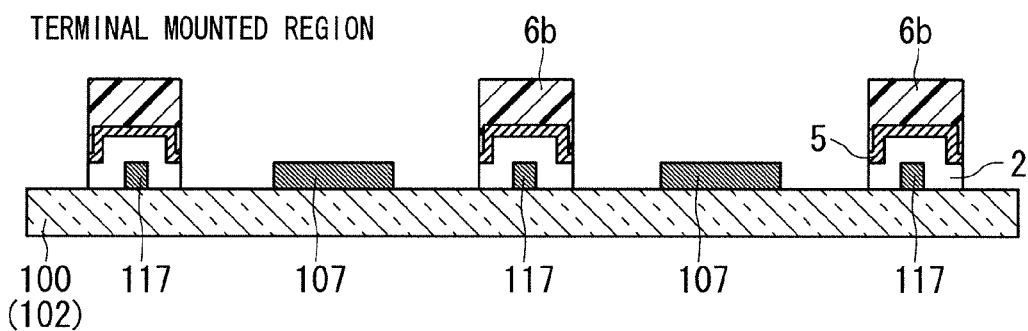

Through the dry etching, in the display region 101, as shown in FIG. 13A, the contact hole 51 connected to the contact hole 61 and having the same shape as that of the contact hole 61 is formed in the protective insulating film 5, and a contact hole serving as one part of the contact hole 151 (FIG. 3) is formed in the gate insulating film 2 and the protective insulating film 5. Furthermore, in the frame region 102, as shown in FIG. 13B, an opening to expose the terminal electrode 107 is formed in the gate insulating film 2 and the protective insulating film 5. In addition, the dry etching was actually performed and it was found that each of the organic planarized film 6 in the display region 101 and the organic planarized film 6b in the frame region 102 was thinned by about 0.4 μm.

Here, in the process of forming the contact hole in the protective insulating film 5 and the gate insulating film 2, an etching mask formed in a different photolithography process may be used without using the organic planarized film 6 as the etching mask. However, in this case, the different photolithography process is added to the production process, which increases the cost. Furthermore, a size of the contact hole needs to be larger in anticipation of displacement that could be generated when the etching mask is formed, which could deteriorate display characteristics. Therefore, with a view to ensuring a proper size of the contact hole, and reducing the number of photolithography processes and the cost, it is preferable to use the organic planarized film 6 as the etching mask.

Then, a first transparent conductive film is formed, for example, by sputtering on the whole surface of the transparent insulating substrate 100 having the contact hole 61 and the like. The first transparent conductive film may be made of IZO or ITO, for example. Then, a photoresist is patterned in a fifth photolithography process, the first transparent conductive film is etched, and the photoresist is removed. Thus, in the display region 101, the lower electrode 71 is formed on the organic planarized film 6 so as to be electrically connected to the common wiring 105 through the contact hole 151. Furthermore, in the frame region 102, a transparent conductive film 72 is formed so as to cover the terminal electrode 107. A structure obtained through the above-described process is shown in FIGS. 14A and 14B.

Figure 15A:
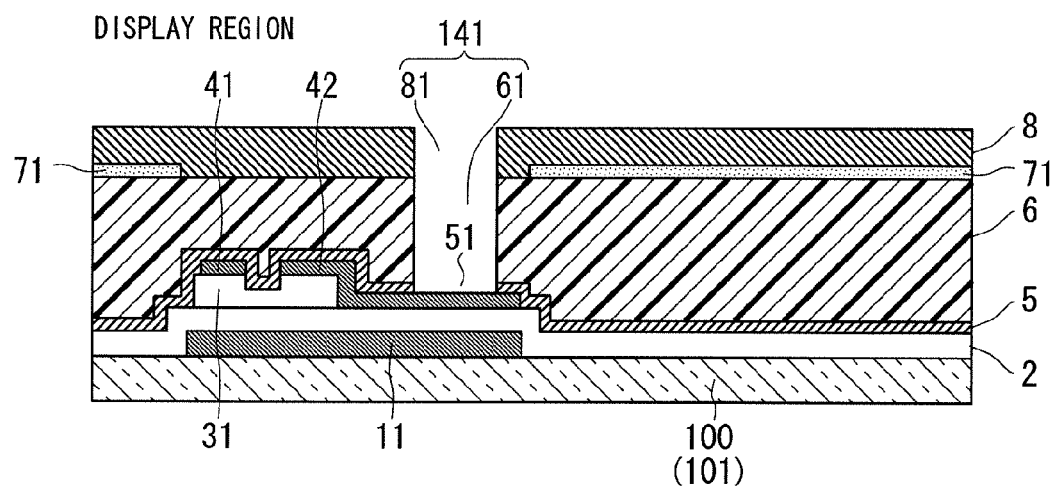
Figure 15B:
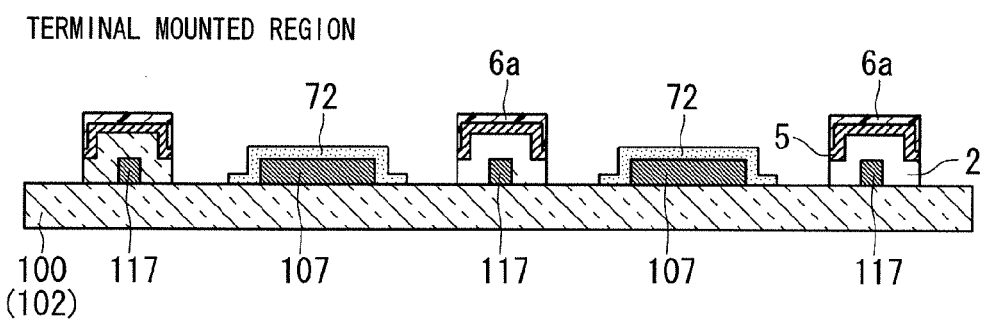

Then, the interlayer insulating film 8 is formed, for example, by plasma CVD on the whole surface of the transparent insulating substrate 100 having the lower electrode 71 and the like. In addition, the interlayer insulating film 8 may be composed of a SiN film, for example. Then, a photoresist is patterned in a sixth photolithography process, the interlayer insulating film 8 is subjected to dry etching, and the photoresist is removed. Thus, in the display region 101, the contact hole 81 connected to the contact hole 61, and a part of the contact hole 151 (FIG. 3) are formed in the interlayer insulating film 8, and in the frame region 102, the interlayer insulating film 8 is completely removed. A structure obtained through the above-described process is shown in FIGS. 15A and 15B.

Here, during the dry etching of the interlayer insulating film 8, the organic planarized film 6b in the frame region 102 functions as a mask for protecting the protective insulating film 5 and the gate insulating film 2 from being damaged by the dry etching. As a result, the organic planarized film 6b is removed a little, and its film thickness is reduced, so that it becomes the organic planarized film 6a shown in FIG. 6. Furthermore, the transparent conductive film 72 protects the terminal electrode 107 from being damaged by the dry etching.

The surface of the transparent insulating substrate 100 not having the organic planarized film 6a and the transparent conductive film 72 is removed a little due to the damage by the dry etching, but this does not affect display performance and not damage reliability of the liquid crystal display panel 1. Here, it is to be noted that in order to prevent the organic planarized film 6b from being completely removed by the dry etching, it is necessary to appropriately set the film thickness of the organic planarized film 6, and appropriately adjust the exposure amount in the fourth photolithography process in advance.

Figure 16A:
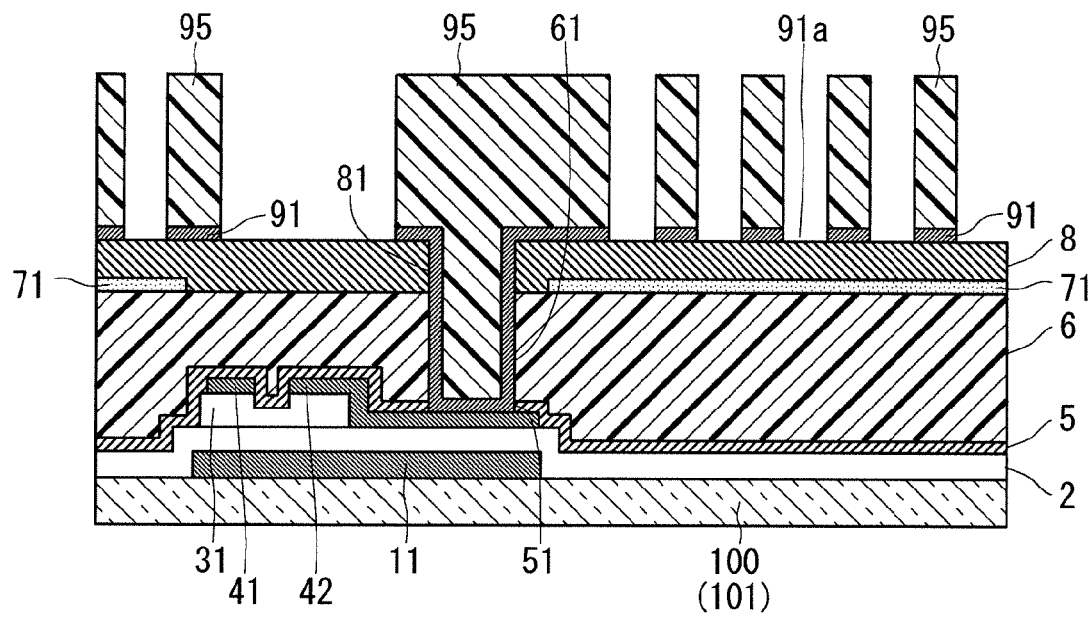
Figure 16B:
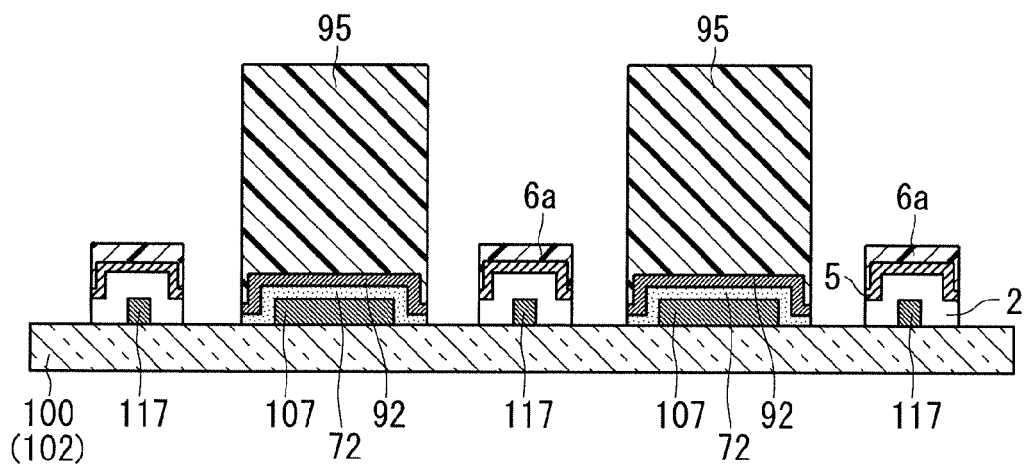

Then, a second transparent conductive film is formed, for example, by sputtering on the whole surface of the transparent insulating substrate 100 having the etched interlayer insulating film 8. The second transparent conductive film may be made of IZO or ITO, for example. Then, a photoresist is patterned in a seventh photolithography process, and the second transparent conductive film is etched. A structure obtained by the etching is shown in FIGS. 16A and 16B. Thus, in the display region 101, the upper electrode 91 having slits 91a is formed on the interlayer insulating film 8 (above the lower electrode 71) so as to be electrically connected to the drain electrode through the contact hole 141. Furthermore, in the frame region 102, a transparent conductive film 92 is formed so as to cover the transparent conductive film 72.

Then, in the display region 101, a photoresist 95 on the upper electrode 91 is removed. In this removing process, the organic planarized film 6a formed above the external wiring 117 is not removed. Therefore, in the case where only the removing process is performed, as shown in FIG. 6, the liquid crystal display panel 1 is completed with the organic planarized film 6a left above the external wiring 117. Here, an upper portion of the photoresist 95, and the organic planarized film 6a above the external wiring 117 in the frame region 102 may be removed by ashing prior to the removing process of the photoresist 95. In this case, as shown in FIG. 7, the completed liquid crystal display panel 1 does not have the organic planarized film above the external wiring 117. In this ashing process, for example, removing speed is preferably on the order of 300 nm/min or more. In addition, the timing to perform the ashing process is not limited to the above, and the organic planarized film 6a may be removed by ashing before the second transparent conductive film is formed.

According to the liquid crystal display panel 1 in the first preferred embodiment described above, the organic planarized film is not disposed above the external wiring 117, or the organic planarized film 6a thinner than the organic planarized film 6 disposed in the display region 101 is disposed in the frame region 102. Therefore, a difference between the height of the laminated structure including the terminal electrode 107 and the height of the laminated structure including the external wiring 117 (height difference) can be small. Thus, pressure bonding between the terminal electrode 107 and the external element with the ACF sandwiched between them is not hindered by the organic planarized film 6, so that the terminal electrode 107 and the external element can be surely connected. As a result, a contact defect can be prevented, and yield and reliability can be enhanced. Furthermore, in the etching process of the protective insulating film 5 and the like (FIGS. 13A and 13B), and the etching process of the interlayer insulating film 8 (FIGS. 15A and 15B), the protective insulating film 5 can be protected with the organic planarized film 6b. Therefore, the protective insulating film 5 can be prevented from being damaged, so that the protective insulating film 5 can keep protecting the external wiring 117, and as a result, the external wiring 117 can be prevented from being damaged and corroded.

<Second Preferred Embodiment>

As described in the first preferred embodiment, in the development process of the organic planarized film 6 (FIGS. 12A and 12B) and in the dry etching process of the protective insulating film 5 and the like (FIGS. 13A and 13B), the organic planarized films 6 and 6b above the external wiring 117 are thinned to some extent. However, the organic planarized films 6 and 6b are removed too much depending on a variation in production, so that the protective insulating film 5 formed above the external wiring 117 could be partially or wholly exposed during the dry etching process of the protective insulating film 5 and the like (FIGS. 13A and 13B).

In this case, a surface of the protective insulating film 5 has been damaged or a residue of the organic planarized film 6b has been attached on that surface in the process of forming the interlayer insulating film 8 (from FIGS. 14A and 14B to 15A and 15B), which deteriorates an adhesion property between the protective insulating film 5 and the interlayer insulating film 8. As a result, the interlayer insulating film 8 could come off or be peeled from the surface of the protective insulating film 5.

Thus, according to a second preferred embodiment of the present invention, after the interlayer insulating film 8 has been formed on the whole surface of the transparent insulating substrate 100 having the lower electrode 71 and the like, the interlayer insulating film 8 is patterned in the frame region 102 so as to cover a laminated structure 121 including the external wiring 117, the gate insulating film 2, the protective insulating film 5, and the organic planarized film 6b. In addition, here, it is assumed that the organic planarized film 6 above the external wiring 117 has been removed by about 1 μm during the fourth photolithography process.

FIG. 17 is a cross-sectional view illustrating a terminal configuration according to the second preferred embodiment. According to the second preferred embodiment, the protective insulating film 5 is protected sufficiently, and the interlayer insulating film 8 is disposed to cover the laminated structure 121 including the external wiring 117, the gate insulating film 2, the protective insulating film 5, and the organic planarized film 6b. Thus, the interlayer insulating film 8 can be prevented from being peeled from the protective insulating film 5. In addition, the interlayer insulating film 8 protects the external wiring 117, so that the external wiring 117 can be more prevented from being damaged and corroded.

Furthermore, the laminated structure 121 shown in FIG. 17 includes the organic planarized film 6b, but in the case where the organic planarized film 6b has been already removed in the dry etching process of the protective insulating film 5 (FIGS. 13A and 13B), the laminated structure 121 does not include the organic planarized film 6b.

<Variation of First Preferred Embodiment and Second Preferred Embodiment>

The present invention can be applied not only to the terminal mounted region, but also to a region in which the organic planarized film 6 is to be thinned or removed in the frame region 102 of the liquid crystal display panel 1, or on the transparent insulating substrate 100 before the liquid crystal display panel 1 is divided individually. Furthermore, a structure and a production method generally provided with an amorphous silicon semiconductor or a polycrystalline silicon semiconductor can be applied to the above-described thin film transistor 106. In other words, the present invention can be applied to any thin film transistor 106 as long as the organic planarized film 6 is formed above the thin film transistor 106.

Furthermore, the liquid crystal display panel using the display panel according to the present invention has been described in the above, as an example. However, the display panel according to the present invention is not limited to it, and may be used as an organic electroluminescence (EL) panel including a planarized film.

While the invention has been shown and described in detail, the foregoing description is in all aspects illustrative and not restrictive. It is therefore understood that numerous modifications and variations can be devised without departing from the scope of the invention.

What is claimed is:

1. A display panel comprising:
    an insulating substrate in which a display region and a frame region surrounding said display region are defined;
    a thin film transistor disposed on said insulating substrate in said display region;
    a terminal electrode disposed on said insulating substrate in said frame region;
    a wiring disposed on said insulating substrate, for connecting said thin film transistor to said terminal electrode;
    an insulating film having an opening in said terminal electrode so that there is no direct contact between said insulating film and said terminal electrode, and covering said wiring; and
    a planarized film disposed on said thin film transistor, and having a planarized upper surface, wherein
    said planarized film is not disposed, or a planarized film having a smaller film thickness than that of said planarized film disposed in said display region is disposed, above said wiring in said frame region.

2. The display panel according to claim 1, further comprising:
    an interlayer insulating film covering a laminated structure including said wiring and said insulating film, in said frame region.

3. The display panel according to claim 1, wherein
    said planarized film comprises one of an organic resin film and a spin on glass (SOG) film.

4. A liquid crystal display panel including a display panel, wherein said display panel comprises:
- an insulating substrate in which a display region and a frame region surrounding said display region are defined;
- a thin film transistor disposed on said insulating substrate in said display region;
- a terminal electrode disposed on said insulating substrate in said frame region;
- a wiring disposed on said insulating substrate, for connecting said thin film transistor to said terminal electrode;
- an insulating film having an opening in said terminal electrode so that there is no direct contact between said insulating film and said terminal electrode, and covering said wiring; and
- a planarized film disposed on said thin film transistor, and having a planarized upper surface, wherein
- said planarized film is not disposed, or a planarized film having a smaller film thickness than that of said planarized film disposed in said display region is disposed, above said wiring in said frame region, and
- said liquid crystal display panel comprises:
- a liquid crystal layer disposed above said planarized film in said display region; and
- a pixel electrode and an opposed electrode disposed between said planarized film and said liquid crystal layer in said display region and provided to apply a fringe electric field to said liquid crystal layer.

5. A method of manufacturing a display panel comprising the steps of:
- (a) forming a thin film transistor on an insulating substrate in a display region, in said insulating substrate said display region and a frame region surrounding said display region being defined, forming a terminal electrode on said insulating substrate in said frame region, forming a wiring for connecting said thin film transistor to said terminal electrode on said insulating substrate, and forming an insulating film for covering said terminal electrode and said wiring;
- (b) forming a planarized film having a planarized upper surface on a whole surface of said insulating substrate after said step (a);
- (c) forming a contact hole in said planarized film on said thin film transistor, in said display region, and removing said planarized film formed above said terminal electrode and reducing a film thickness of said planarized film formed above said wiring to be thinner than said planarized film in said display region, in said frame region, and
- (d) forming an opening over said terminal electrode by etching said insulating film after said step (c).

6. The method of manufacturing the display panel according to claim 5, wherein
said step (c) comprises the step of:
- reducing the film thickness of said planarized film formed above said wiring in said frame region to be thinner than said planarized film formed in said display region by performing a photolithography step with a photomask having a light-blocking portion having a lattice pattern, and
- a sum of a size of one lattice in said lattice pattern and a distance between adjacent lattices in said lattice pattern is 3μm.

7. The method of manufacturing the display panel according to claim 5, wherein
in said step (d), said insulating film is etched with said planarized film used as an etching mask.

8. The method of manufacturing the display panel according to claim 5, further comprising the step of:
- (e) removing said planarized film formed above said wiring in said frame region by ashing after said step (d).

9. A display panel comprising:
- an insulating substrate in which a display region and a frame region surrounding said display region are defined;
- a thin film transistor disposed on said insulating substrate in said display region;
- a terminal electrode disposed on said insulating substrate in said frame region;
- a wiring disposed on said insulating substrate, for connecting said thin film transistor to said terminal electrode;
- an insulating film having an opening over said terminal electrode, and covering said wiring; and
- a planarized film disposed on said thin film transistor and above said wiring in said frame region, and having a planarized upper surface, wherein
- said planarized film having a smaller film thickness in said frame region than that of said planarized film disposed in said display region.

10. A liquid crystal display panel including a display panel, wherein said display panel comprises:
- an insulating substrate in which a display region and a frame region surrounding said display region are defined;
- a thin film transistor disposed on said insulating substrate in said display region;
- a terminal electrode disposed on said insulating substrate in said frame region;
- a wiring disposed on said insulating substrate, for connecting said thin film transistor to said terminal electrode;
- an insulating film having an opening over said terminal electrode, and covering said wiring; and
- a planarized film disposed on said thin film transistor and above said wiring in said frame region, and having a planarized upper surface, wherein
- said planarized film having a smaller film thickness in said frame region than that of said planarized film disposed in said display region, and
- said liquid crystal display panel comprises:
- a liquid crystal layer disposed above said planarized film in said display region; and
- a pixel electrode and an opposed electrode disposed between said planarized film and said liquid crystal layer in said display region and provided to apply a fringe electric field to said liquid crystal layer.

* * * * *